US008391795B2

(12) United States Patent
Fu

(10) Patent No.: US 8,391,795 B2
(45) Date of Patent: Mar. 5, 2013

(54) METHOD AND DEVICE FOR RANKING FREQUENCIES

(75) Inventor: Jie Fu, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/574,560

(22) PCT Filed: Jun. 1, 2011

(86) PCT No.: PCT/CN2011/075082
§ 371 (c)(1),
(2), (4) Date: Jul. 20, 2012

(87) PCT Pub. No.: WO2012/051856
PCT Pub. Date: Apr. 26, 2012

(65) Prior Publication Data
US 2012/0289163 A1    Nov. 15, 2012

(30) Foreign Application Priority Data
Oct. 21, 2010    (CN) .......................... 2010 1 0518647

(51) Int. Cl.
*H04B 15/00* (2006.01)
(52) U.S. Cl. ....... 455/62; 455/410; 455/421; 455/422.1; 455/452.2; 455/522
(58) Field of Classification Search .................... 455/62, 455/410, 421, 422.1, 452.2, 522
See application file for complete search history.

(56) References Cited

U.S. PATENT DOCUMENTS

| 5,606,727 | A | * | 2/1997 | Ueda ............................. 455/513 |
| 5,862,451 | A | * | 1/1999 | Grau et al. .................... 725/116 |
| 5,901,357 | A | * | 5/1999 | D'Avello et al. ............. 455/454 |
| 6,549,784 | B1 | * | 4/2003 | Kostic et al. .................. 455/501 |
| 6,684,075 | B2 | * | 1/2004 | Bergenlid et al. ............. 455/447 |
| 8,155,594 | B2 | * | 4/2012 | Brisebois et al. ............ 455/63.1 |
| 8,213,867 | B2 | * | 7/2012 | Zhang et al. .................. 455/62 |
| 2004/0152482 | A1 | * | 8/2004 | Raffel et al. .................. 455/522 |
| 2005/0020236 | A1 | * | 1/2005 | Mauney et al. ............... 455/403 |
| 2007/0189259 | A1 | * | 8/2007 | Sollenberger et al. ........ 370/342 |
| 2008/0057934 | A1 | * | 3/2008 | Sung et al. ................. 455/422.1 |
| 2009/0130978 | A1 | * | 5/2009 | King et al. ..................... 455/62 |

FOREIGN PATENT DOCUMENTS

| CN | 101217740 A | 7/2008 |
| CN | 101656980 A | 2/2010 |
| CN | 101808345 A | 8/2010 |
| CN | 101977422 A | 2/2011 |

\* cited by examiner

*Primary Examiner* — Edward Urban
*Assistant Examiner* — Hsin-Chun Liao
(74) *Attorney, Agent, or Firm* — Kilpatrick Townsend & Stockton

(57) ABSTRACT

A method and a device for ranking frequencies are provided. The method includes: acquiring the strongest m frequencies in the neighboring cells as alternative frequencies, wherein m is greater than 1; after a preset period, acquiring all the n frequencies in the current neighboring cells; acquiring a frequency with the weakest signal from the alternative frequencies as the weakest frequency; selecting any one frequency X in the n frequencies except m frequencies; comparing the frequency X with the weakest frequency, and replacing the weakest frequency with the frequency X to update the alternative frequency if a signal of the frequency X is stronger than a signal of the weakest frequency; judging whether all of the n frequencies except m frequencies are selected, if no, repeating the steps above, and if yes, outputting the alternative frequencies; ranking the alternative frequencies according to the signal intensity.

10 Claims, 3 Drawing Sheets

METHOD AND DEVICE FOR RANKING FREQUENCIES

CROSS REFERENCE TO RELATED APPLICATIONS

This application claims priority to International Application No. PCT/CN2011/075082, filed on Jun. 1, 2011, which claims the priority of 201010518647.5, filed on Oct. 21, 2010, the entire contents of which are incorporated herein by reference in their entirety.

FIELD OF THE DISCLOSURE

The present disclosure generally relates to communication field, and more particularly, to a method and a device for ranking frequencies.

BACKGROUND OF THE DISCLOSURE

Wireless communication system is widely used in urban and rural areas so as to provide communication services such as voice, video, grouped data, message delivery, broadcast, and the like. Wireless communication system may include a plurality of cells. The term "cell" used herein is referred to as the smallest region covered by a communication node and/or the subsystem of the node which serves the coverage region. Upon being powered on, or after losing a signal which covers the cell, a mobile terminal performs a cell search process to obtain information on a cell in which the mobile terminal is currently located, and the cell is referred to as a serving cell.

When in operation, the mobile terminal regularly measures the carrier signal intensity of BCCH (Broadcast Common Control Channel) of the serving cell and neighboring cells, so as to switch to another cell in time in which the signal intensity is higher than that in the current cell. And a list is created by obtaining system information of the serving cell. This list is known as a BCCH Allocation list or a BA list, which is associated with the assignment of the BCCH frequencies of the neighboring cells. The BA list, adapted for reselecting cells, includes a plurality of frequencies which are assigned by the wireless network and act as alternative frequencies for the mobile terminal. A mobile station measures and synchronizes the frequencies periodically, and receives system messages from BCCH for reselecting cells. The number of the alternative frequencies of the BA list is configured depending on the conditions of networks, namely, some networks have more alternative frequencies, and some have less. The BA list is stored in a permanent register or a SIM card of the mobile terminal, so that the mobile terminal searches for the frequencies in the neighboring cells based on the BA list when the mobile terminal is powered on. The mobile terminal detects the frequencies with a different interval when in an idle mode or in an active mode. While conducting a voice communication, the mobile terminal frequently searches for the frequencies in the neighboring cells, in order to switch to the frequency having the highest signal intensity to ensure an excellent voice quality.

In a conventional art, when the mobile terminal is powered on or switched to a new cell, every SIM card selects six frequencies having the highest signal intensity of the neighboring cells by using a generic sort algorithm. After 5 seconds, the SIM card re-selects another six frequencies of the neighboring cells by using the same sort method. However, when the mobile terminal does not change its position, the six frequencies selected within the previous 5 seconds are generally identical to the six frequencies selected within the later 5 seconds, or only a few of the six frequencies vary. Therefore, there is no need to rank the six frequencies each time. And nowadays, mobile terminals are functioned with multiple SIM cards, and each SIM card requires to create a BA list and to search for a multi-group of alternative frequencies, which causes a dramatic increase of operating data in the mobile terminal. If the conventional method for ranking frequencies is used, the response time of the mobile terminal may be affected greatly, resulting in poor operating performance of the mobile terminal.

A normal experiment result shows that there is little difference between two adjacent ranking results in a practical network.

In static cases (when the mobile terminal does not move), there are about 90 percent of cases that no more than two frequencies vary in two adjacent ranking results.

In dynamic cases (when the mobile terminal has moved), there are about 80 percent of cases that no more than three frequencies vary in two adjacent ranking results.

In the practical network, when a mobile terminal searches for the neighboring cells, generally, 10 to 20 frequencies may be found, and in the case of a mobile terminal with three SIM cards, even up to 60 frequencies may be found.

As a result, the conventional ranking method for reselecting six frequencies having the highest signal intensity every 5 seconds results in a waste in operating resource of the mobile terminal.

SUMMARY

Embodiments of the present disclosure provide a method and a device for ranking frequencies, to decrease the computation amount of ranking frequencies.

One embodiment of the present disclosure provides a method for ranking frequencies. The method includes:

1) obtaining m frequencies having the highest signal intensity in neighboring cells, the m frequencies acting as alternative frequencies, and m being greater than 1;

2) obtaining all n frequencies in current neighboring cells after a predetermined time period;

3) obtaining one frequency having the lowest signal intensity among the alternative frequencies as a weakest frequency;

4) selecting one frequency X from the n frequencies except the m frequencies;

5) comparing the frequency X with the weakest frequency, and replacing the weakest frequency with the frequency X if the signal intensity of the frequency X is higher than the signal intensity of the weakest frequency so as to update the alternative frequencies;

6) judging whether each of the n frequencies except the m frequencies is selected: if the determination is in the affirmative, outputting the alternative frequencies; otherwise, repeating the above steps 3) to 5); and 7) ranking e alternative frequencies in the order of signal intensity.

Another embodiment of the present disclosure provides a device for ranking frequencies. The device includes:

a first obtaining unit adapted for obtaining m frequencies having the highest signal intensity in neighboring cells, the m frequencies acting as alternative frequencies, and m being greater than 1;

a second obtaining unit adapted for obtaining all frequencies in current neighboring cells after a predetermined time period;

a third obtaining unit adapted for obtaining one frequency having the lowest signal intensity among the alternative frequencies as a weakest frequency;

a comparing unit adapted for selecting frequency X from the n frequencies except the m frequencies and comparing the frequency X with the weakest frequency after obtaining the weakest frequency, and a replacing unit being enabled if the signal intensity of the frequency X is higher than the signal intensity of the weakest frequency; otherwise, a judging unit being enabled if the signal intensity of the frequency X is lower than the signal intensity of the weakest frequency;

a replacing unit adapted for replacing the weakest frequency with frequency X so as to update the alternative frequencies;

a judging unit adapted for judging whether all the n frequencies except the m frequencies have been selected: if the determination is in the affirmative, enabling an outputting unit; otherwise, enabling the third obtaining unit;

an outputting unit adapted for outputting the current alternative frequencies; and a first ranking unit adapted for ranking the output alternative frequencies in the order of signal intensity.

Compared with the prior art, embodiments of this disclosure have the following advantages:

The device for ranking frequencies obtains one frequency having the lowest signal intensity among the alternative frequencies as the weakest frequency after a predetermined time period. By comparing the weakest frequency with one frequency X selected from the n frequencies except the no alternative frequencies in the current neighboring cells, if the signal intensity of X is higher than the signal intensity of the weakest frequency, the weakest frequency is then replaced with frequency X. The process for searching for the weakest frequency among the updated alternative frequencies is repeated until all the n frequencies except the m alternative frequencies have been selected. The normal experiment result shows that there is little variation in the signal intensity of the alternative frequencies. Therefore, there is no need to replace the weakest frequency frequently according to the embodiment of the present disclosure. However, in the prior art, no matter whether the signal intensity of the current frequencies has varied or not, m frequencies having the highest signal intensity are re-obtained among all n frequencies and re-ranked. Accordingly, the computation amount of ranking frequencies is decreased greatly.

DETAILED DESCRIPTION OF THE DISCLOSURE

Embodiments of the present disclosure provide a method and a device for ranking frequencies, to decrease the computation amount of ranking frequencies.

Figure 1:
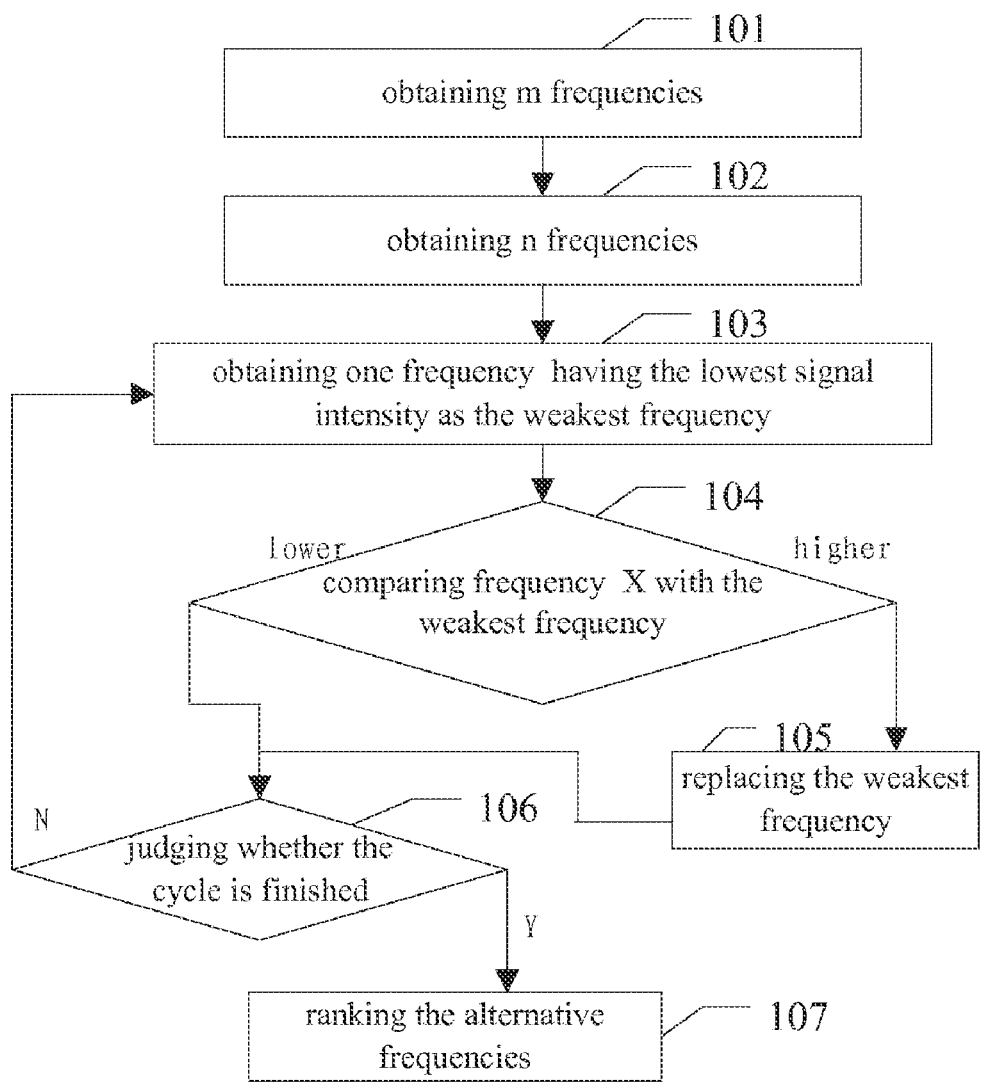
FIG. 1 is a flow chart of a method for ranking frequencies according to one embodiment of the present disclosure.

Referring to FIG. 1, the method for ranking frequencies according to one embodiment of the present disclosure includes the following steps: step 101, step 102, step 103, step 104, step 105, step 106, and step 107.

Step 101, m frequencies are obtained.

Upon a mobile terminal being powered on or switched to another cell, a device for ranking frequencies obtains m frequencies having the highest signal intensity in the neighboring cells. The m frequencies act as alternative frequencies, and m is greater than 1.

Generally, m equals to 6, namely, six frequencies having the highest signal intensity in the neighboring cells are obtained as the alternative frequencies. And the six frequencies are stored in a BCCH Allocation (BA) list created in the mobile terminal, so that the mobile terminal is able to search for the frequency having the highest signal intensity among the alternative: frequencies in the BA list in time and switch thereto when the mobile terminal has moved.

Step 102, n frequencies are obtained.

After a predetermined time period, the device for ranking frequencies obtains all n frequencies in the neighboring cells. This is because the mobile terminal needs to update the frequencies and the signal intensity thereof timely, so as to ensure that the mobile terminal switches to a frequency having the highest signal intensity while conducting a voice communication.

Step 103, one frequency X having the lowest signal intensity is obtained.

After the predetermined time period, the device for ranking frequencies obtains one frequency having the lowest signal intensity among the m alternative frequencies as the weakest frequency.

Step 104, the frequency X is compared with the weakest frequency.

After obtaining the weakest frequency, one frequency X is selected from the n frequencies except the m frequencies, and the frequency X is then compared with the weakest frequency. If the signal intensity of X is higher than the signal intensity of the weakest frequency, proceed to step 105; otherwise, proceed to step 106.

Step 105, the weakest frequency is replaced.

When the signal intensity of frequency X is higher than the signal intensity of the weakest frequency, the weakest frequency is then replaced with frequency X, so as to update the alternative frequencies:

Step 106, judging whether the cycle is finished.

When the signal intensity of frequency X is lower than that of the weakest frequency, or after the weakest frequency has been replaced with frequency X, judge whether all the n frequencies except the m frequencies have been selected:

if the determination is in the affirmative, outputting the current alternative frequencies; otherwise, proceed to step 103 to continue the process of comparison for the weakest frequency.

Step 107, the alternative frequencies are ranked.

The step 107 is performed to rank the current in alternative frequencies after outputting the current alternative frequencies, so as to ensure that the mobile terminal switches timely to a frequency having the highest signal intensity when the mobile terminal has moved.

In an embodiment of the present disclosure, the device for ranking frequencies obtains one frequency having the lowest signal intensity among the alternative frequencies as the weakest frequency after a predetermined time period. By comparing the weakest frequency with one frequency X selected from the n frequencies except the m alternative frequencies in the current neighboring cells, if the signal intensity of frequency X is higher than the signal intensity of the weakest frequency, the weakest frequency is then replaced with the frequency X. The process for searching for the weakest frequency among the updated alternative frequencies is repeated until all the n frequencies except the m alternative frequencies have been compared. The normal experiment result shows that there is little variation in the signal intensity of the alternative frequencies. Therefore, the weakest frequency would not be replaced frequently according to the embodiment of the present disclosure. However, in the prior art, no matter whether the signal intensity of the current frequencies has varied or not, m frequencies having the highest signal intensity are re-obtained among all n frequencies and re-ranked. Accordingly, the computation amount of ranking frequencies is decreased greatly.

Figure 2:
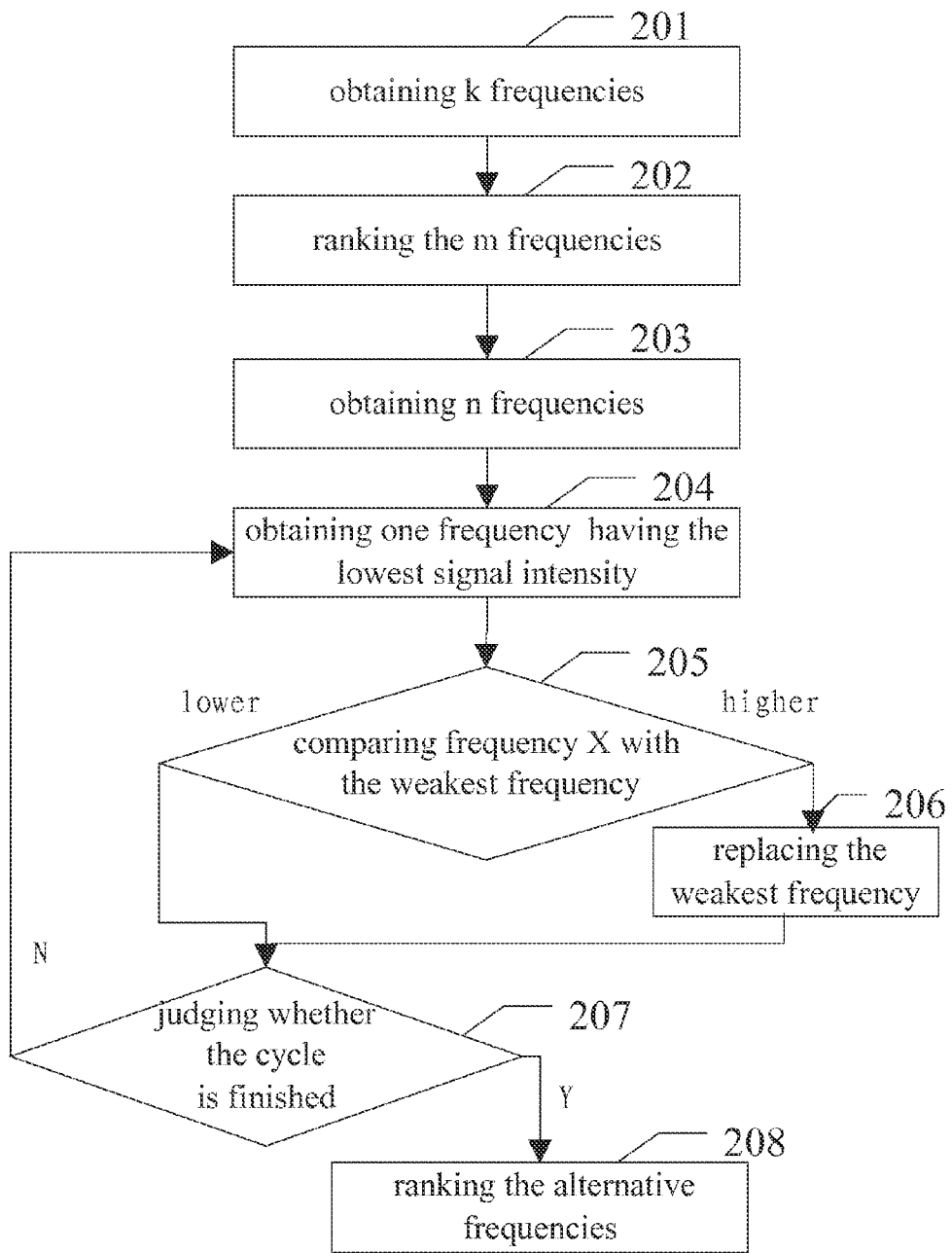
FIG. 2 is a flow chart of a method for ranking frequencies according to another embodiment of the present disclosure.

In another embodiment, the method for ranking frequencies will be described by using a bubble sort algorithm. Referring to FIG. 2, the method for ranking frequencies according to the embodiment of the present disclosure includes the following steps: step 201, step 202, step 203, step 204, step 205, step 206, step 207, and step 208.

Step 201, k frequencies are obtained.

Upon a mobile terminal being powered on or switched to another cell, a device for ranking frequencies obtains all k frequencies in the current neighboring cells, and k is greater than or equal to m.

Generally, there is little variation in the number of all the frequencies obtained in the current neighboring cells by the device for ranking frequencies, in other words, k is generally equal to m.

Step 202, the m frequencies are ranked.

The device for ranking frequencies selects m frequencies having the highest signal intensity among k frequencies by using the bubble sort algorithm. The m frequencies act as alternative frequencies. The process specifically includes:

Successively comparing the signal intensities of each pair of two adjacent frequencies until the k frequencies are iterated through, and outputting the frequency having the highest signal intensity Which is ranked first in the BA list; and Using the above method of comparison, and outputting the frequencies having the highest signal intensity among the remained frequencies, which are then ranked second, third, . . . , in the BA list in sequence, and stopping the comparison until m frequencies have been selected.

Step 203, n frequencies are obtained.

After a predetermined time period, the device for ranking frequencies obtains all n frequencies in the neighboring cells. In this manner, the mobile terminal is able to update the frequencies and the signal intensity of the neighboring cells timely, so as to ensure that the mobile terminal switches to a frequency having the highest signal intensity while conducting a voice communication.

After obtaining the n frequencies, some frequencies which are same with the alternative frequencies are labeled and not selected and compared during iterating through all of the frequencies.

Step 204, one frequency having the lowest signal intensity obtained.

After the predetermined time period, the device for ranking frequencies obtains one frequency having the lowest signal intensity among the m alternative frequencies as the weakest frequency. The process specifically includes:

Successively comparing the signal intensities of each pair of two adjacent frequencies from the beginning of the first frequency until the m frequencies are iterated through, and outputting the frequency having the lowest signal intensity which acts as the weakest frequency.

In terms of a common standard, the predetermined time period may be configured to be 5 seconds when the mobile terminal is in stand-by mode; alternatively, the predetermined time period may he configured to be 0.5 second when the mobile terminal is conducting a voice communication.

Step 205, frequency X is compared with the weakest frequency.

After obtaining the weakest frequency, one frequency X is selected from the unlabeled frequencies within the n frequencies, and the frequency X is then compared with the weakest frequency. If the signal intensity of frequency X is higher than the signal intensity of the weakest frequency, proceed to step 206; otherwise, if the signal intensity of frequency X is lower than the signal intensity of the weakest frequency, proceed to step 207. All of the n frequencies are iterated through.

The device for ranking frequencies labels each frequency which has already been selected in previous steps.

Step 206, the weakest frequency is replaced.

When the signal intensity of frequency X is higher than the signal intensity of the weakest frequency, the weakest frequency is then replaced with the frequency X, so as to update the alternative frequencies.

Step 207, judging whether the cycle is finished.

When the signal intensity of frequency X is lower than the signal intensity of the weakest frequency, or after the weakest frequency has been replaced with frequency X, the step 207 is performed to judge whether all the n frequencies have already been labeled:

if the determination is in the affirmative, outputting the current alternative frequencies; otherwise, proceeding to step 204 to continue the process of comparison for the weakest frequency.

Step 208, the alternative frequencies are ranked.

The step 208 is performed to rank the current in alternative frequencies after outputting the current alternative frequencies, so as to ensure that the mobile terminal switches timely to a frequency having the highest signal intensity when the mobile terminal has moved. The process specifically includes:

Successively comparing the signal intensities of each pair of two adjacent frequencies from the beginning of the first frequency until all of the m frequencies are iterated through, and outputting the frequency having the highest signal intensity which is ranked first in the BA list; and Using the above method of comparison, and outputting the frequencies having the highest signal intensity among the remained frequencies, which are then ranked second, third, . . . , in the BA list in sequence, and stopping the comparison until m frequencies have been selected.

In the above embodiment, the method for ranking frequencies of the present disclosure has been described in detail by taking a bubble sort algorithm for an example. In the conventional art, the cycle times for ranking m frequencies having the highest signal intensity among the n frequencies using the bubble sort algorithm is about $m \times n-(1+m) \times m/2$. Whereas the cycle times is about $m \times t+(n-m)+m \times (m-1)/2$ according to the embodiment of the present disclosure, wherein t is the number of times that the weakest frequency is replaced, the maximum value of t equals to $(n-m)$, $m \times t$ is a cycle times of searching for the weakest frequency; $(n-m)$ is a cycle times of iterating through $(n-m)$ frequencies, and $m \times (m-1)/2$ is a cycle times of ranking the alternative frequencies.

As shown in a normal experiment result, after the BA list has been updated, there are about 90 percent of cases that no more than two frequencies vary being replaced in static cases (when the mobile terminal does not move); there are about 80 percent of cases that no more than three frequencies vary being replaced in dynamic cases when the mobile terminal has moved). When the mobile terminal searches for the neighboring cells, generally, 10 to 20 frequencies may be found, and in the case of a mobile terminal with three SIM cards, even up to 60 frequencies may be found. For the sake of clarity, the following description will take n=10 (10 frequencies have been found), m=6 (6 frequencies are selected as the alternative frequencies) and t=3 (3 alternative frequencies have been replaced after a predetermined time period) as an example. The cycle times according to the conventional art is 39, whereas the cycle times according to the embodiment of the present disclosure is 37. However, in practical application, the number of the frequencies found by the mobile terminal is much greater than 10. By taking n=20 (20 frequencies have been found) for an example herein, the cycle times according to the conventional art is 99, whereas the cycle times according to the embodiment of the present disclosure is 47. Therefore, compared with the conventional art, the computation amount of ranking frequencies in the mobile terminal is decreased greatly.

In order to clarify the objects, characteristics and advantages of the disclosure, the image sharpening method in the embodiments of present disclosure will be described in detail hereinafter.

Step 1, the frequencies are ranked for the first time.

Upon being powered on, the mobile terminal receives frequencies information in the current neighboring cells offered by the network broadcast. Assuming that the frequencies information includes 15 frequencies of the neighboring cells, the mobile terminal measures signal intensity of the 15 frequencies, and selects 6 frequencies having the highest signal intensity among the 15 frequencies and ranks the 6 frequencies in a descending order of signal intensity by using a bubble sort algorithm. The method specifically includes:

Obtaining the signal intensity of the 15 frequencies;

Successively comparing the signal intensities of each pair of two adjacent frequencies from the beginning of the first frequency to the end of the 15 frequencies, and outputting the frequency having the highest signal intensity; and Using the above method of comparison, and outputting 5 frequencies having the highest signal intensity among the retained frequencies in sequence.

The output 6 frequencies are stored at corresponding positions of the alternative frequencies in the BA list sequence, which are ranked in a descending order of signal intensity.

Step 2, a BA list is updated.

Updating the BA list every 5 seconds when the mobile terminal is in a stand-by mode;

Updating the BA list 0.5 second when the mobile terminal is conducting a voice communication.

To update the BA list needs to obtain the whole frequencies again in the current neighboring cells and to measure the signal intensity of each of the frequencies.

In the conventional art, the mobile terminal would perform step 1 again to reselect six frequencies having the highest signal intensity for ranking. However, the normal experiment result shows that there is little difference between two adjacent ranking results in a practical network after the updating of the BA list:

In static cases (when the mobile terminal does not move), there are about 90 percent of cases that no more than two frequencies vary in two adjacent ranking results;

In dynamic cases (when the mobile terminal has moved), there are about 80 percent of cases that no more than three frequencies vary in two adjacent ranking results.

Based on the above cases, a method for ranking the frequencies to update the BA list according to one embodiment of the present disclosure, specifically includes:

Assuming that 15 frequencies are obtained by the device for ranking the frequencies when the mobile terminal re-obtains the frequencies in the current neighboring cells, the frequencies which correspond to the six alternative frequencies are then labeled within the 15 frequencies after measuring the signal intensity of each of the 15 frequencies.

Obtaining the weakest frequency among the alternative frequencies, the weakest frequency is compared one by one with the 9 frequencies unlabeled. When the signal intensity of the weakest frequency is lower than that of one of the 9 frequencies unlabeled, the weakest frequency is then replaced. Re-obtaining another weakest frequency among the updated alternative frequencies, the other weakest frequency is compared with the remained 9 frequencies. When each of the 9 frequencies has been compared, the cycle is finished and the current alternative frequencies are output.

The 6 alternative frequencies are ranked again by using the bubble sort algorithm so as to update the BA list.

In most cases, only two or three frequencies vary in the ranking results of the BA list. As a result, the weakest frequency would not be replaced much when updating the BA list every time. Therefore, the computation amount of ranking frequencies is decreased greatly compared with the prior art.

Figure 3:
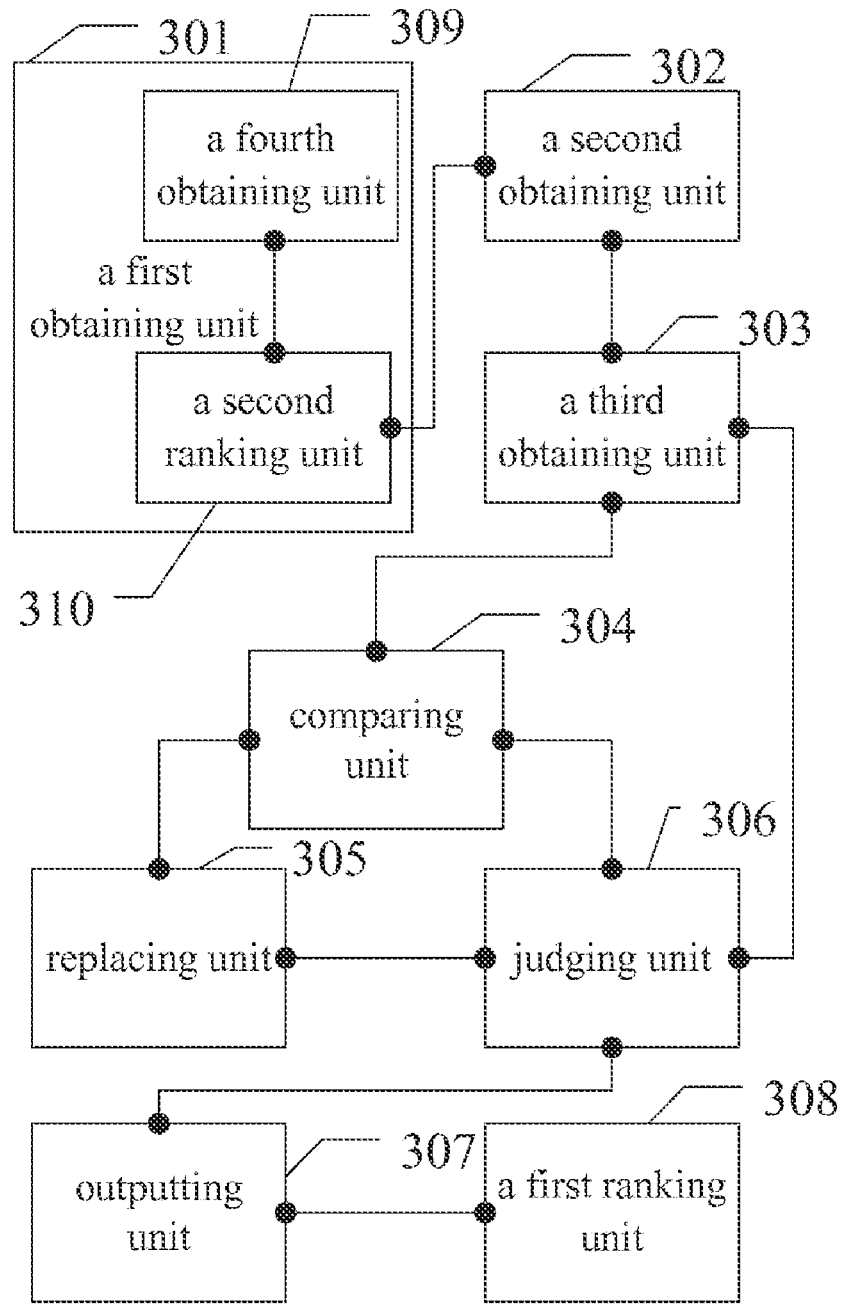
FIG. 3 is a schematic block diagram of a device for ranking frequencies according to one embodiment of the present disclosure.

Hereunder, a device for ranking the frequencies according to one embodiment of the disclosure will be described in detail in conjunction with the accompanying drawings, FIG. 3 is a schematic block diagram illustrating a device for ranking frequencies according to one embodiment of the present disclosure. Referring to FIG. 3, the device of the embodiment includes:

A first obtaining unit 301, adapted for obtaining m frequencies having the highest signal intensity in neighboring cells, the m frequencies acting as alternative frequencies, and in being greater than 1;

A second obtaining unit 302, adapted for obtaining all n frequencies in current neighboring cells after a predetermined time period;

A third obtaining unit 303, adapted for obtaining one frequency having the lowest signal intensity among the alternative frequencies as a weakest frequency;

A comparing unit 304, adapted for selecting frequency X from the n frequencies except the m frequencies and comparing the frequency X with the weakest frequency, after obtaining the weakest frequency by the third obtaining unit 303. If the signal intensity of the frequency X is higher than the signal intensity of the weakest frequency, a replacing unit 305 is enabled; otherwise, a judging unit 306 is enabled;

The replacing unit 305, adapted for replacing the weakest frequency with frequency X so as to update the alternative frequencies;

The judging unit 306, adapted for judging whether all the n frequencies except the m frequencies have been selected: if the determination is in the affirmative, an outputting unit 307 is enabled; otherwise, the third obtaining unit 303 is enabled;

The outputting unit 307, adapted for outputting the current alternative frequencies; and A first ranking unit 308, adapted for ranking the output alternative frequencies in the order of signal intensity.

The first obtaining unit 301 according to one embodiment of the present disclosure further includes:

A fourth obtaining unit 309, adapted for obtaining all k frequencies in the current neighboring cells, and k being greater than or equal to m; and A second ranking unit 310, adapted for successively comparing the signal intensities of each pair of two adjacent frequencies from the beginning of the first frequency until the k frequencies are iterated through, and outputting the frequency having the highest signal intensity. By using the above comparison method, (m−1) frequencies having the highest signal intensity of the remaining frequencies are output in sequence.

The operating process of the units of the device for ranking the frequency according to one embodiment of the present disclosure will be described as follows.

Upon a mobile terminal being powered on or switched to another cell, the fourth obtaining unit 309 obtains all k frequencies in the current neighboring cells, and k is greater than or equal to m. The second ranking unit 310 successively compares the signal intensities of each pair of two adjacent frequencies until the k frequencies are iterated through, and outputs the frequency having the highest signal intensity. By using the above comparison method, (m−1) frequencies having the highest signal intensity of the remaining frequencies are output in sequence. The output m frequencies act as the alternative frequencies in the BA list, and the process of ranking the alternative frequencies is finished.

After a predetermined time period, the mobile terminal needs to update the BA list. In terms of a common standard, the predetermined time period may be configured to be 5 seconds when the mobile terminal is in stand-by mode; alternatively, the predetermined time period be configured to be 0.5 second when the mobile terminal is conducting a voice communication. The second obtaining unit 302 obtains all n frequencies in the current neighboring cells and measures the signal intensity of each of the n frequencies. And the third obtaining unit 303 obtains one frequency having the lowest signal intensity among the alternative frequencies as the weakest frequency. After selecting one frequency X from the n frequencies except the m frequencies, the comparing unit 304 compares the frequency X with the weakest frequency and enables the replacing unit 305 if the signal intensity of the frequency X is higher than the signal intensity of the weakest frequency; otherwise, the comparing unit 304 enables the judging unit 306 if the signal intensity of the frequency X is lower than the signal intensity of the weakest frequency.

When the signal intensity of frequency X is higher than the signal intensity of the weakest frequency, the weakest frequency is then replaced with the frequency X by the replacing unit 305, so as to update the alternative frequencies, and then the judging unit 306 is enabled.

When the signal intensity of frequency X is lower than the signal intensity of the weakest frequency or after the weakest frequency is replaced with frequency X, the judging unit 306 judges Whether all the n frequencies except the m frequencies have been selected: if the determination is in the affirmative, the outputting unit 307 is enabled to output the current alternative frequencies; otherwise, the third obtaining 303 is enabled to continue comparing the n frequencies except the m frequencies with the weakest frequency.

After outputting the current alternative frequencies, the first rank 308 ranks the output alternative frequencies in the order of signal intensity.

It should be noted to those skilled in the art that the whole or part of the steps of the method for ranking the frequencies according to the above embodiments may be executed by relevant hardware instructed by a program. The program may be stored in a computer readable storage medium. The readable storage medium may be read-only memory, magnetic disk, optical disk, and the like.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for ranking frequencies, comprising:
   1) obtaining m frequencies having the highest signal intensity in neighboring cells, the m frequencies acting as alternative frequencies, and m being greater than 1;
   2) obtaining all n frequencies in current neighboring cells after a predetermined time period;
   3) obtaining one frequency having the lowest signal intensity among the alternative frequencies as a weakest frequency;
   4) selecting one frequency X from the n frequencies except the m frequencies;
   5) comparing frequency X with the weakest frequency, and replacing the weakest frequency with the frequency X if the signal intensity of the frequency X is higher than the signal intensity of the weakest frequency so as to update the alternative frequencies;
   6) judging whether each of the n frequencies except the m frequencies is selected: if the determination is in the affirmative, outputting the alternative frequencies; otherwise, repeating the above steps 3) to 5); and
   7) ranking the alternative frequencies in the order of signal intensity.

2. The method according to claim 1, wherein the step of obtaining one frequency having the lowest signal intensity among the alternative frequencies as the weakest frequency comprises:
   successively comparing the signal intensities of each pair of two adjacent frequencies until the m frequencies are iterated through, and outputting the frequency having the lowest signal intensity.

3. The method according to claim 1, wherein the step of ranking the alternative frequencies in the order of signal intensity comprises:
   successively comparing the signal intensities of each pair of two adjacent frequencies until the m frequencies are iterated through, and outputting the frequency having the highest signal intensity;
   using the above comparison method, and successively outputting (m−1) frequencies having the highest signal intensity of the remaining frequencies.

4. The method according to claim 1, wherein the step of obtaining m frequencies having the highest signal intensity in the neighboring cells comprises:
   obtaining all k frequencies in the current neighboring cells, and k being greater than or equal to m;
   successively comparing the signal intensities of each pair of two adjacent frequencies until the k frequencies are iterated through, and outputting the frequency having the highest signal intensity; and
   using the above comparison method, and successively outputting (m−1) frequencies having the highest signal intensity of the remaining frequencies.

5. The method according to claim 1, wherein after the step of selecting one frequency X from the n frequencies except the m frequencies, the method further comprises:
   labeling the frequencies which have been selected so as to avoid the frequencies which have been compared being repeatedly selected by the device for ranking frequencies during the comparison process.

6. The method according to any one of claims 1 to 4, wherein
   when the mobile terminal is in stand-by mode, the predetermined time period is configured to be 5 seconds; and
   when the mobile terminal is conducting a voice communication, the predetermined time period is configured to be 0.5 second.

7. A device for ranking frequencies, comprising:
- a first obtaining unit adapted for obtaining m frequencies having the highest signal intensity in neighboring cells, the m frequencies acting as alternative frequencies, and m being greater than 1;
- a second obtaining unit adapted for obtaining all n frequencies in current neighboring cells after a predetermined time period;
- a third obtaining unit adapted for obtaining one frequency having the lowest signal intensity among the alternative frequencies as a weakest frequency;
- a comparing unit adapted for selecting frequency X from the n frequencies except the m frequencies and comparing the frequency X with the weakest frequency after obtaining the weakest frequency, and a replacing unit being enabled if the signal intensity of the frequency X is higher than the signal intensity of the weakest frequency; otherwise, a judging unit being enabled if the signal intensity of the frequency X is lower than the signal intensity of the weakest frequency;
- a replacing unit adapted for replacing the weakest frequency with the frequency X so as to update the alternative frequencies;
- a judging unit adapted for judging whether all the n frequencies except the m frequencies have been selected: if the determination is in the affirmative, enabling an outputting unit; otherwise, enabling the third obtaining unit;
- an outputting unit adapted for outputting the current alternative frequencies; and
- a first ranking unit adapted for ranking the output alternative frequencies in the order of signal intensity.

8. The device according to claim 7, wherein the first obtaining unit comprises:
- a fourth obtaining unit adapted for obtaining all k frequencies in the current neighboring cells, and k being greater than or equal to m; and
- a second ranking unit adapted for successively comparing the signal intensities of each pair of two adjacent frequencies until the k frequencies are iterated through, and outputting the frequency having the highest signal intensity; and adapted for using the above comparison method, and successively outputting (m−1) frequencies having the highest signal intensity of the remaining frequencies.

9. The device according to claim 7, wherein the first ranking unit comprises:
- a comparing module adapted for successively comparing the signal intensities of each pair of two adjacent frequencies until the m frequencies are iterated through; and
- an outputting module adapted for successively outputting the frequencies having the highest signal intensity among the remaining frequencies obtained by the comparison process.

10. The device according to claim 7, further comprising:
- a labeling unit adapted for labeling the frequencies which have been selected by the comparing unit so as to avoid the frequencies which have been compared being repeatedly selected by the device for ranking frequencies during the comparison process.

* * * * *

UNITED STATES PATENT AND TRADEMARK OFFICE
CERTIFICATE OF CORRECTION

PATENT NO. : 8,391,795 B2
APPLICATION NO. : 13/574560
DATED : March 5, 2013
INVENTOR(S) : Jie Fu It is certified that error appears in the above-identified patent and that said Letters Patent is hereby corrected as shown below:

In the Claims:

Column 10, Line 61 - Please omit "any one of claims" and replace with -- claim --.
 - Please omit "to 4".

Signed and Sealed this
Fourth Day of June, 2013

Teresa Stanek Rea
*Acting Director of the United States Patent and Trademark Office*